(12) United States Patent
Schmidt et al.

(10) Patent No.: US 10,110,599 B2
(45) Date of Patent: Oct. 23, 2018

(54) MOTOR VEHICLE COMMUNICATION NETWORK WITH SWITCH DEVICE

(71) Applicant: AUDI AG, Ingolstadt (DE)

(72) Inventors: Karsten Schmidt, Ingolstadt (DE); Elmar Schoch, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 15/533,564

(22) PCT Filed: Feb. 29, 2016

(86) PCT No.: PCT/EP2016/000346
§ 371 (c)(1),
(2) Date: Jun. 6, 2017

(87) PCT Pub. No.: WO2016/134855
PCT Pub. Date: Sep. 1, 2016

(65) Prior Publication Data
US 2018/0270230 A1    Sep. 20, 2018

(30) Foreign Application Priority Data

Feb. 27, 2015   (DE) ......................... 10 2015 002 574

(51) Int. Cl.
*H04L 29/06* (2006.01)
*H04L 12/46* (2006.01)
(Continued)

(52) U.S. Cl.
CPC ...... *H04L 63/0876* (2013.01); *B60R 16/0231* (2013.01); *B60R 21/01* (2013.01);
(Continued)

(58) Field of Classification Search
CPC ............. H04L 63/0876; H04L 63/0236; H04L 63/126; H04L 63/0272; H04L 63/162;
(Continued)

(56) References Cited

U.S. PATENT DOCUMENTS 8,892,696 B1   11/2014 Thai
2003/0051131 A1   3/2003 Reinold et al.
(Continued)

FOREIGN PATENT DOCUMENTS

CN    1575462    2/2005
CN    101860551    10/2010
(Continued)

OTHER PUBLICATIONS

German Office Action dated Aug. 30, 2016 from German Patent Application No. 10 2015 002 574.0, 5 pages.
(Continued)

*Primary Examiner* — Robert B Leung
(74) *Attorney, Agent, or Firm* — Staas & Halsey LLP

(57) ABSTRACT

At a first port of a switch device of a motor vehicle, a device identifier of a device of the motor vehicle is received. An authenticity test on the basis of the device identifier is performed. If a test result of the authenticity test is positive, communication data of the device addressed to at least one further device of the motor vehicle are received at the first port and transmitted in a first VLAN of a communication network of the motor vehicle to the at least one further device. If the test result is negative, the communication data are rejected at the first port. A diagnostic inquiry for the device is received from a diagnostic device at a second port of the switch device. Independently of the test result the diagnostic inquiry is forwarded via the first port to the device in a second VLAN of the communication network.

13 Claims, 3 Drawing Sheets

(51) Int. Cl.
*B60R 16/023* (2006.01)
*B60R 21/01* (2006.01)
*G07C 5/08* (2006.01)

(52) U.S. Cl.
CPC .......... *G07C 5/0816* (2013.01); *H04L 12/467* (2013.01); *H04L 63/0236* (2013.01); *H04L 63/0272* (2013.01); *H04L 63/126* (2013.01); *H04L 63/162* (2013.01)

(58) Field of Classification Search
CPC ..... H04L 12/467; G07C 5/0816; B60R 21/01; B60R 16/231
See application file for complete search history.

(56) References Cited

U.S. PATENT DOCUMENTS

| | | | | |
|---|---|---|---|---|
| 2003/0217148 | A1* | 11/2003 | Mullen | H04L 63/08 709/225 |
| 2004/0003237 | A1* | 1/2004 | Puhl | B60R 16/0234 713/156 |
| 2014/0226289 | A1 | 8/2014 | VanHouten et al. | |
| 2015/0116081 | A1* | 4/2015 | Nair | B60R 25/04 340/5.61 |
| 2016/0026787 | A1* | 1/2016 | Nairn | G06F 13/4282 726/17 |

FOREIGN PATENT DOCUMENTS

| | | |
|---|---|---|
| CN | 102724087 | 10/2012 |
| CN | 104333552 | 2/2015 |
| DE | 10 2006 009 583 A1 | 6/2007 |
| DE | 10 2012 208 205 A1 | 11/2013 |
| DE | 10 2013 202 064 A1 | 8/2014 |
| DE | 10 2015 002 574.0 | 2/2015 |
| EP | 1 796 051 A1 | 6/2007 |
| WO | PCT/EP2016/000346 | 2/2016 |

OTHER PUBLICATIONS

International Search Report dated May 24, 2016 from International Patent Application No. PCT/EP2016/000346, 2 pages.

English translation of the International Preliminary Report on Patentability dated Sep. 7, 2017 from International Patent Application No. PCT/EP2016/000346, 7 pages.

Chinese Office Action dated Feb. 5, 2018, from Chinese Patent Application No. 201680003760.5 (previously submitted in IDS of Mar. 22, 2018) with English language translation of summary of Examiner's comments, (8 pages total).

* cited by examiner

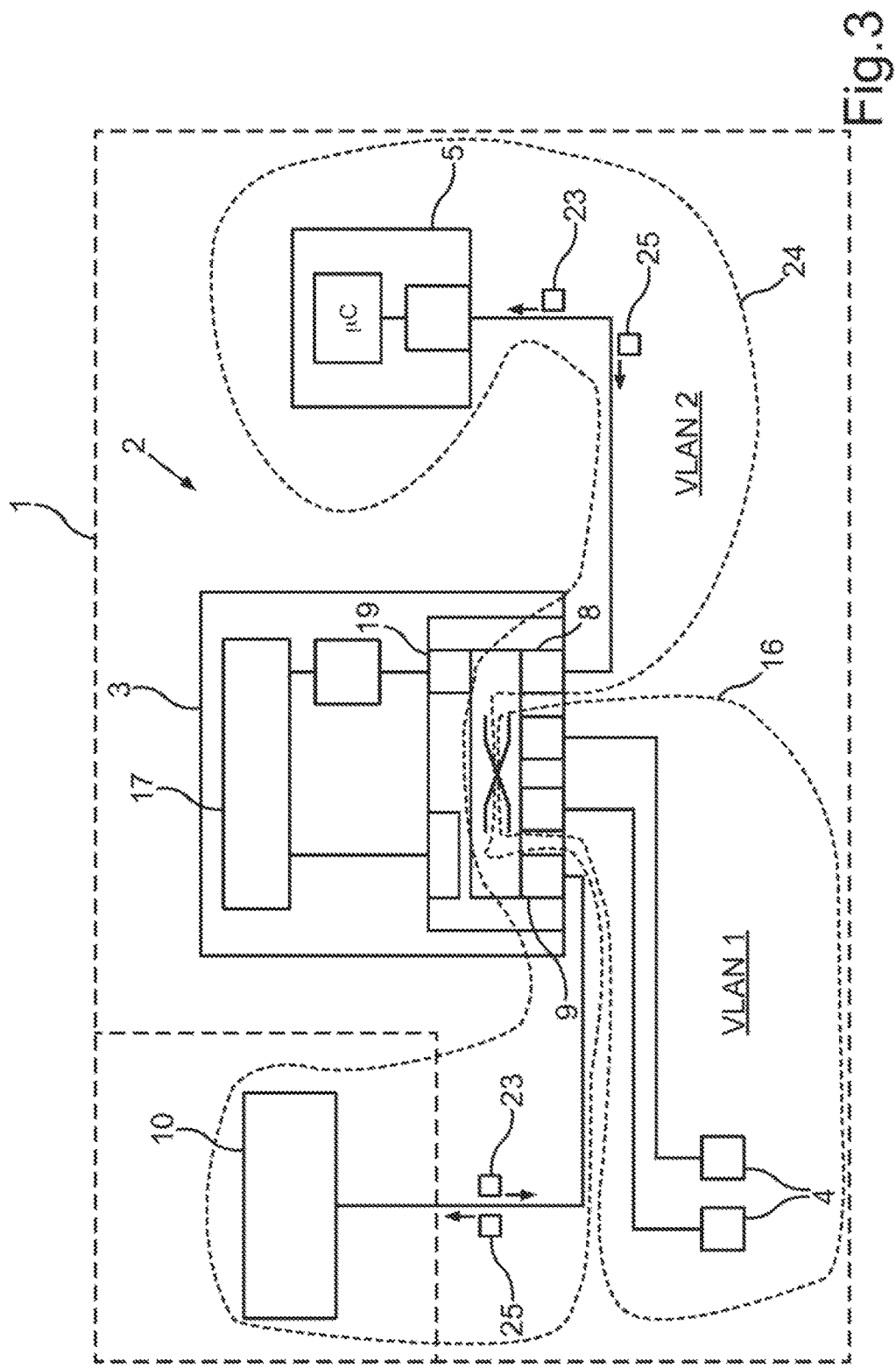

MOTOR VEHICLE COMMUNICATION NETWORK WITH SWITCH DEVICE

CROSS REFERENCE TO RELATED APPLICATIONS

This application is the U.S. national stage of International Application No. PCT/EP2016/000346, filed on Feb. 29, 2016. The International Application claims the priority benefit of German Application No. 10 2015 002 574.0 filed on Feb. 27, 2015. Both the International Application and German Application are incorporated by reference herein in their entirety.

BACKGROUND

Described herein is a method for protecting, in a communication network of a motor vehicle, devices of the motor vehicle against communication data of a non-authenticated device. Also described herein is a switch device by which the communication network is provided, and a motor vehicle having the switch device as described herein.

In a motor vehicle, a communication network can be provided on the basis of the Ethernet standard. An Ethernet structure can include switches or switch devices, on the one hand, and network users, that is to say devices of the motor vehicle, on the other hand. The switch device can separate communication data streams from one another by providing a VLAN (Virtual Local Area Network or virtual network). By this, an unauthorized access of a device to another device of the motor vehicle can be prevented. A motor vehicle with a switch device which provides a VLAN is known, for example, from German Patent Application Publication 10 2013 202 064 A1. According to this, devices of a motor vehicle are connected to ports of a switch device. A port is understood to refer to the physical connecting device for a communication cable in relation to the switch device and communication network described herein. In each case, only one communication cable can be connected to a port.

For a device to be able to feed communication data into a VLAN, that is to say transmit them via a port of the switch into the VLAN, the device must be licensed for the VLAN. An authentication by using approaches based on the network standard IEEE 802.1x can be provided for this purpose, by way of example. If a device is not authenticated because its device identifier is not entered or stored as authorized or valid for the VLAN of the switch device, the switch device will switch off any communication at the switch port affected. The only exception is the reception of a repeated authentication request of the device.

However, this means that no further communication to a non-authorized device can take place via the motor vehicle communication network. From the perspective of data security, this is a desirable behavior. The disadvantageous factor is that, for example, the non-authorized device cannot be recognized via the communication network even in a workshop. As a result, it then remains unclear why the device is not operating correctly in the motor vehicle.

A motor vehicle having an Ethernet network as communication network is known, for example, from German Patent Application Publication 10 2012 208 205 A1. Components of the network are connected to one another via a switch device. Individual data packets from communication data of the devices can be allocated to a particular class of data by evaluating a VLAN tag.

From German Patent Application Publication 10 2006 009 583 A1, it is known to provide diagnostic functionalities by a diagnostic module on board a motor vehicle. Additionally, a vehicle-external tester or a diagnostic device can be connected to the motor vehicle in order to provide further diagnostic modules.

SUMMARY

Described herein is a method of providing for an extensive diagnosis of one or more motor vehicle devices in a motor vehicle.

One or more aspects of the disclosure may be achieved by the switch device described herein and a motor vehicle having the switch device.

A switch device for a motor vehicle is described herein. The switch device has ports for connecting devices of the motor vehicle and a control device. The control device is designed to perform one or more embodiments of the method described herein. The control device can be provided, for example, by a processor device of the switch device. The switch device can be designed, for example, as a switch (network diplexer or distributor) or router. In particular, the switch device is designed to exchange data between the ports in a familiar manner in accordance with the Ethernet standard.

Also described herein is a motor vehicle which has the switch device. In the motor vehicle, a device of the motor vehicle is in each case connected at the ports of the switch device. At the switch device, the devices can be connected, for example, via network cables, for example Ethernet cables. Through the switch device a communication network is provided for exchanging communication data between the devices. The communication data are then exchanged within the communication network in a first VLAN between the devices.

An embodiment in which one or some or each of the devices is in each case a control device for adjusting a driving mode and/or driving dynamics of the motor vehicle is also described herein. In other words, the control devices are, in particular, driving-safety-related devices. For such safety-related devices, an authenticity check is particularly relevant and brings advantages since, as a result, the safety of the vehicle passengers is improved. Driving mode is here understood to be the technical process which relates to the movement of the motor vehicle itself.

By the method described herein, the switch device of the motor vehicle communication network is operated in the following manner: at one of the ports which is called a first port in this case, the switch device receives a device identifier of one of the devices of the motor vehicle. An authenticity test of the device is performed on the basis of the device identifier. In other words, it is checked whether the device identifier is stored, for example in the switch device, that a device having this device identifier is licensed for the first VLAN, that is to say is allowed to use the first VLAN. The device identifier can be secured for example cryptographically. An authentication based on a challenge-response authentication, known per se, can then be performed, for example.

If a test result of the authenticity test is positive, that is to say the device is licensed or the device identifier is valid, communication data of the device are received at the first port which are addressed to at least one further device of the motor vehicle. The addressing can take place in this case in the manner known per se from computer network technology, e.g. via an IP address (IP—Internet Protocol). The communication data received are transmitted in the first VLAN of the communication network to the at least one further device. The communication data are, particularly, data which influence the driving mode and/or the driving dynamics of the motor vehicle.

If the test result is negative, however, the communication data are rejected or ignored by the switch device at the first port or deleted. In other words, in the case of a negative test result, when the device identifier is invalid or the device is not authenticated, the device must or cannot transmit its communication data to the first VLAN. As a result, the other devices are protected against an influence of the unauthenticated or non-authorized device, that is to say against its communication data. In particular, no communication data of the other devices are output at the device either from the first VLAN and/or via the first port.

However, the method also provides that a diagnostic inquiry generated by a diagnostic device is received for the device at a second port of the switch device. In other words, the diagnostic device signals that it would like to request diagnostic data from the device connected at the first port. In the method described herein, independently of the test result (authenticated device or non-authenticated device) the diagnostic inquiry is then forwarded via the first port to the device by the switch device. The diagnostic inquiry is then transmitted in a second VLAN of the communication network.

The method as described herein results in the advantage that the diagnosability is also retained for such a device which is subject to a communication disconnection for useful data, that is to say the communication data of which are rejected at the first port because the device has not been successfully authenticated.

The method also includes further developments described herein, the features of which result in additional advantages.

In a further development, diagnostic data of the device generated by the device in response to the diagnostic inquiry are transmitted to the diagnostic device in the second VLAN independently of the test result (device authenticated or not authenticated). In other words, the device can send out diagnostic data to the first port and via the second VLAN, especially to the diagnostic device, that is to say via the second port, independently of the test result of the authenticity test. In this context, however, the sending out of communication data into the first VLAN still remains blocked. This results in the advantage that the device cannot exert any influence on the remaining devices of the communication network even by virtue of the diagnostic data.

According to a further development, communication data of the device are forwarded into the first VLAN by the switch device for as long as the authenticity test lasts. In other words, the device can firstly communicate with the other devices via the first port, that is to say send out communication data. In the meantime, the authenticity test can be performed by the switch device. As long as no test result is present, the device can send out communication data into the first VLAN via the first port. If the test result then shows that the device could not be authenticated, that is to say is not authorized, the communication data of the device are rejected or blocked at the first port from this time onward. This results in the advantage that the switch device can be designed to be low in resources without this resulting in a delay in the communication in the first VLAN. This is particularly important, in particular, when starting up or booting or starting a motor vehicle.

For this reason, this embodiment is carried out for example also during a start of the motor vehicle and particularly exclusively during a start of the motor vehicle.

According to a further development, the diagnostic data are only forwarded if a test result of an authenticity test of the diagnostic device is positive. In other words, an authenticity test is performed also for the diagnostic device. This results in the advantage that no damaging data by a non-authenticated device can be transmitted to a device of the motor vehicle also via the second port of the switch device, that is to say the diagnostic port.

According to a further development, the second VLAN is set up dynamically. In other words, the second VLAN is provided only when needed, if, for example, a diagnostic device sends out a diagnosis inquiry to the second port. In particular, the second VLAN is ended again after ending the diagnosis, that is to say when, for example, a diagnosis termination signal has been received by the switch device. The development results in the advantage that no unused communication channel exists in the communication network via which damaging data, for example non-authenticated control commands, can be sent out to a device of the motor vehicle.

According to a further development, the authenticity test of the device is performed during a start of the motor vehicle. In other words, the authenticity test is performed when starting up or booting the motor vehicle, when the device and/or the switch device are switched on or taken into operation after a parked phase. This can take place, for example, after the ignition of the motor vehicle has been switched on. During the start-up of the motor vehicle, the rejection of communication data is not hazardous.

According to a further development, blocking of the first VLAN at the first port during the driving mode is also provided in order to take into consideration the case that a defect occurs in the device during the operation of the motor vehicle. In this development, a blocking command is received by the switch device which can come from outside the switch device, that is to say the blocking command can be generated by a device-external device. In dependence on the blocking command and independently of the test result, the communication data of the device are then rejected by the switch device at the first port. This results in the advantage that a diagnostic facility of the motor vehicle can generate a blocking command if an attack or unwanted influence coming from the first device is recognized in the operation of the motor vehicle. By this, it is possible to counter, for example, the problem of a so-called "babbling idiot". If a device sends communication data out into the first VLAN too frequently and/or uncontrollably, the first device can be excluded from the first VLAN via the blocking command if its communication data are rejected at the first port.

The motor vehicle as described herein is for example designed as a motor vehicle, particularly as a passenger motor vehicle.

BRIEF DESCRIPTION OF THE DRAWINGS

These and other aspects and advantages will become more apparent and more readily appreciated from the following description of the exemplary embodiments, taken in conjunction with the accompanying drawings of which:

FIG. 3 is a diagrammatic representation of the motor vehicle from FIG. 1 during a diagnosis of the non-authorized device.

DETAILED DESCRIPTION OF THE PREFERRED EMBODIMENT

Figure 1:
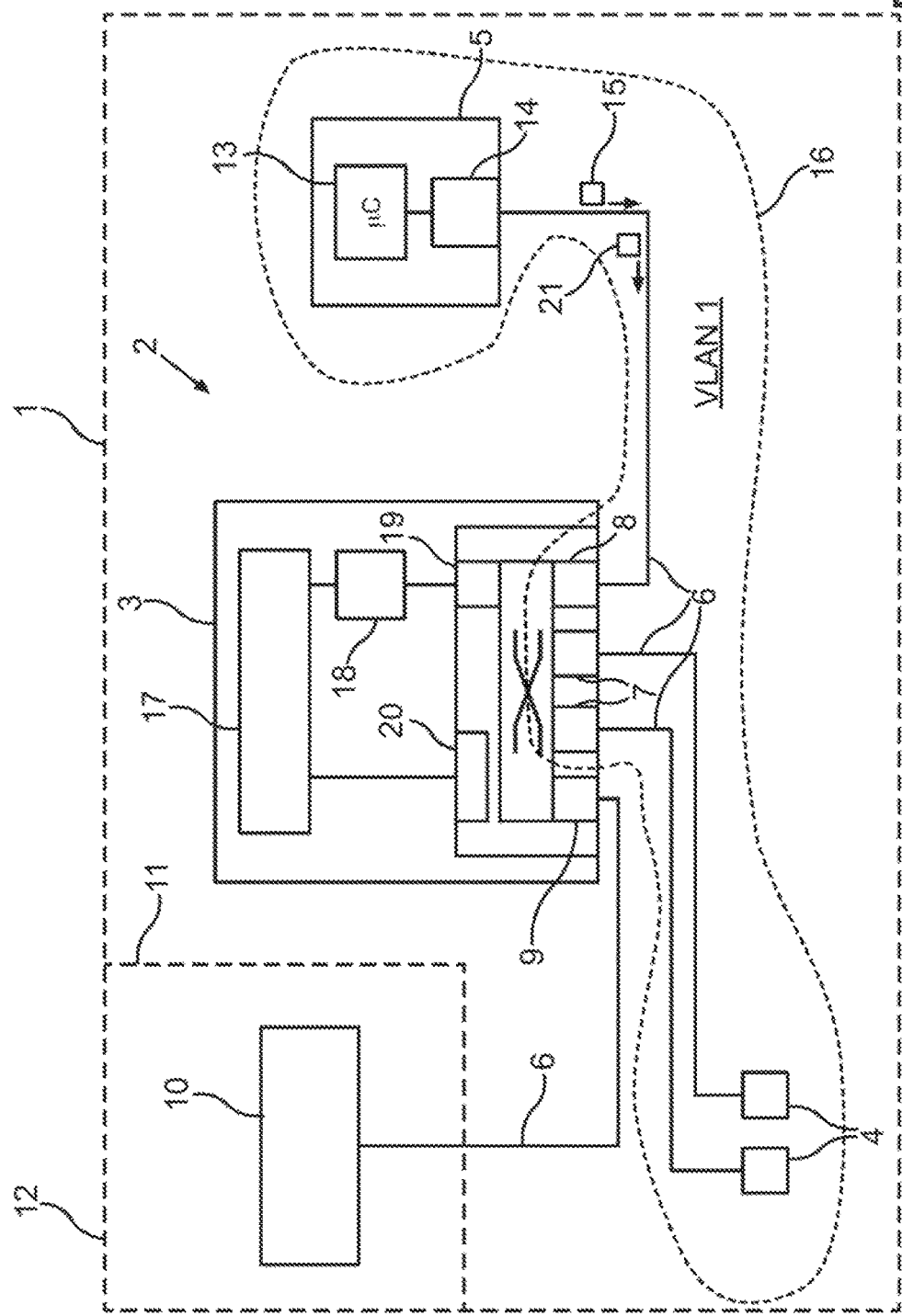
FIG. 1 is a diagrammatic representation of an embodiment of the motor vehicle described herein with a communication network.

Reference will now be made in detail to example embodiments which are illustrated in the accompanying drawings, wherein like reference numerals refer to like elements throughout.

The exemplary embodiment explained in the text which follows includes one more example embodiments. In the one or more exemplary embodiments, the described components of the embodiments in each case represent individual features, to be considered independently of one another, which develop the disclosure in each case also independently of one another and are thereby also to be considered individually. However, the described components or features of the embodiments can also be used in combination with other components or features from other embodiments. That is, the embodiments described can also be supplemented by other ones of the features of other embodiments described.

In the drawings, functionally equal elements are in each case provided with the same reference symbols.

FIG. 1 shows a motor vehicle 1 which can be, for example, a motor vehicle, especially a passenger motor vehicle. The motor vehicle 1 can have a communication network 2 which can be formed by a switch device 3 to which devices 4, 5 of the motor vehicle 1 can be connected. Each device 4, 5 can be connected in each case via a network cable or communication cable 6 to a network cable connection or a connecting device or a port 7, 8. For example, each port 7, 8 can be designed in accordance with the RJ45 standard as a socket for an RJ45 plug or as another electrical interface with electrical contacts. Thus, port refers to, in particular, both the mechanical design of the connecting device and the electrical contacts.

At the switch device 3, a diagnostic device 10 can be connected temporarily or permanently at a further port 9. In a first variant 11, the diagnostic device 10 can be a vehicle-external device which, for example, can be connected to the port 9 in a workshop. In a second variant 12, the diagnostic device 10 can be integrated in the motor vehicle 1. The diagnostic device 10 can also be connected to the port 9 via a network cable 6.

At the device 5 it is illustrated that each of the devices 4, 5 can be designed as a control device which can have a processor device 13 which can be coupled to the network cable 6 via a network connection 14 which, for example, can include an Ethernet controller and/or an electrical network connection.

During the operation of the motor vehicle 1, the devices 4, 5 can exchange communication data via the communication network 2. A communication of the devices 4, 5 via the communication network 2 can take place, e.g. in accordance with the Ethernet standard and/or on the basis of the IP.

For example, the device 5 can send out communication data 15 to one of the devices 4 into the communication network 2. The communication data 15 are managed by the switch device 3 in a virtual or logical network. The communication data 15 are exchanged by this system in a Virtual Local Area Network or virtual network 16 (VLAN 1) as is known per se from the related art.

However, only authorized devices can send their communication data into the virtual network 16 in the case of the motor vehicle 1. For checking the authenticity of each device, the switch device 3 can have a control device 17 which, for example, can be provided by a processor device, for example a microcontroller (µC) or an embedded system. The control device 17 can, similarly as shown in the case of the device 5, be coupled via a network connection 18 and a further port 19 to the ports 7, 8, 9 at which the devices 4, 5 and the diagnostic device 10 are connected. Furthermore, a port control of ports 7, 8, 9 can be provided by the control device 17 via a configuration connection 20. By this, it can be controlled or specified by the control device 17 whether communication data are received or accepted or output via a particular port 7, 8, 9 or whether the communication data are rejected or blocked or ignored.

For example, it can be provided in the case of the motor vehicle 1 that in an authorization phase, for example during a start of the motor vehicle 1, each device 4, 5, which is connected to a port 7, 8, sends out a respective device identifier 21 to the respective port 7, 8. The device identifier 21 can be secured cryptographically, in particular. It is then possible to perform, for example, an authentication based on a challenge-response method, known per se.

In FIG. 1 it is illustrated, by way of example, for the device 5 that the device 5 sends out its device identifier 21 to the port 8. The device identifier 21 can include, for example, a manufacturer of the device 5 or an identifying digit or identifying number which can have been stored in the device 5 when the user of the motor vehicle 1 bought the device 5. Via the port 8, the control device 17 can receive the device identifier 21 of the device 5. The control device 17 can then compare the device identifier 21, for example, with a list of licensed devices, the respective device identifier of which can be stored in the switch device 3.

If the test result is positive, that is to say the device 5 is one of integrity or licensed according to the device identifier 21, the virtual network 16 illustrated in FIG. 1, and to which the device 5 is integrated, can be produced. If the device 5 is not licensed, that is to say the test result for the device identifier 21 is negative, that is to say the device 5, i.e. the device identifier 21, is not stored in the switch device 3 as licensed, it can be initiated or controlled via a configuration command 22 at the configuration input 20 by the control device 17 that communication data 15 of the device 5 are rejected or blocked or ignored at the port 8. This results in the virtual network 16 illustrated in FIG. 2 from which the device 5 is excluded.

Figure 2:
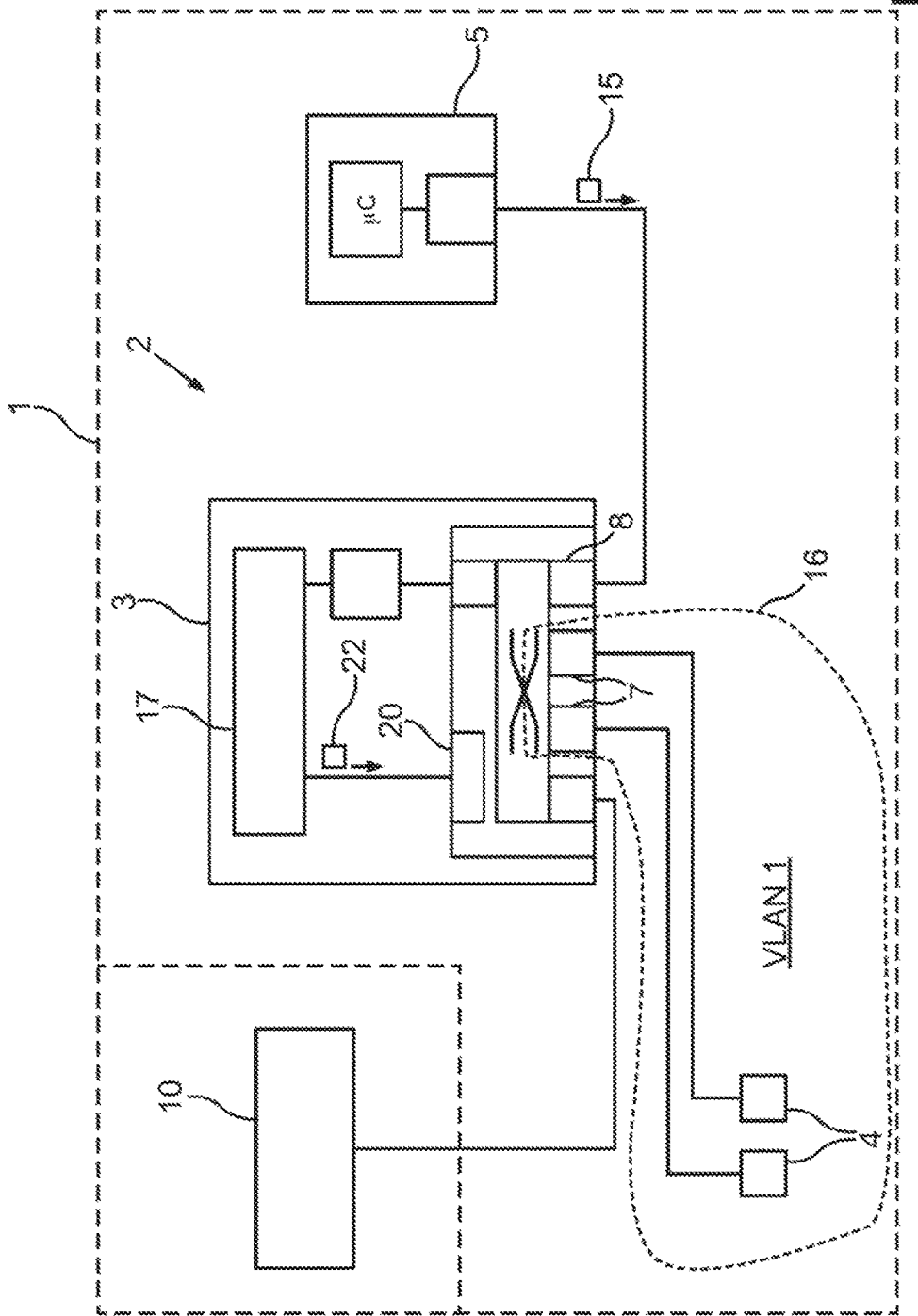
FIG. 2 is the motor vehicle from FIG. 1 after recognition of a non-authorized device.

In the text which follows, it is assumed that the test result was negative and has reliably produced the situation according to FIG. 2.

During a diagnosis or checking of the motor vehicle 1 it may be provided that by using the diagnostic device 10, a diagnostic inquiry 23 is generated, that is to say a data packet with a diagnostic command which is to be transmitted, for example, to the device 5 via the communication network 2. The diagnostic inquiry 23 can be transmitted, for example, via port 9 and port 19 to the control device 17. By using the control device 17 it is possible to recognize that the diagnostic inquiry 23 does not concern communication data for a driving mode or a driving dynamics adjustment but a request or a command for generating diagnostic data. For example, this can be established from the fact that the data have been received via port 9. The control device 17 can provide, therefore, that port 8, via which the non-authorized device 5 can be reached, is utilized for sending out the diagnostic inquiry 23. This can be achieved in that a second virtual network 24 is set up or configured which can also be designed in accordance with the VLAN standard (VLAN 2). This results in the situation illustrated in FIG. 3.

It is now possible that the diagnostic inquiry 23 is forwarded to the device 5 without impairing the virtual network 16 of the licensed or authorized devices 4. In response to the diagnostic inquiry 23, the device 5 can generate diagnostic data 25 which can be accepted at port 8 and output via the second virtual network 24 at port 9 and transmitted to the diagnostic device 10. Due to the logical isolation of the virtual networks 16, 24, a transmission of data between these two virtual networks 16, 24 is not possible. By this configuration or arrangement of the communication system, the devices 4 of the first virtual network 16 remain protected against data of the device 5.

In the case of the motor vehicle 1, the primary concept thus provides in that control devices like devices 4, 5 must authenticate themselves at switch 3. For this purpose, known methods can be used. However, port 8 is not completely disconnected at switch 3 even in the case of unsuccessful authentication rather only the productive VLAN is deactivated, that is to say the virtual network 16 in the example. Thus, communication and disturbance of the network 16 can no longer take place. For the purpose of diagnosis, a special VLAN can be set up dynamically which is let through in a targeted manner by switch 3 even without authentication, namely network 24 in the example.

The primary advantage obtained is thus the maintenance of the diagnostic capability with simultaneous disconnection of communication for useful data, that is to say communication data, in the motor vehicle 1.

Fundamental mechanisms for this concept described can be provided at low expenditure on the basis of a VLAN with switch devices or switch systems.

Overall, the disclosure shows how the diagnostic capability can be maintained with simultaneous disconnection of communication in automotive Ethernet networks.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in Superguide v. DIRECTV, 358 F3d 870, 69 USPQ2d 1865 (Fed. Cir. 2004).

The invention claimed is:

1. A method for operating a switch device of a motor vehicle communication network, comprising:
   receiving a device identifier of a device of the motor vehicle connected to a first port of the switch device;
   performing an authenticity test of the device based on the device identifier;
   if a test result of the authenticity test is positive, receiving communication data of the device addressed to at least one further device of the motor vehicle at the first port and transmitting the communication data in a first virtual local area network (VLAN) of the communication network to the at least one further device;
   if the test result is negative:
      rejecting the communication data at the first port, so that in a case of a negative test result, if the device is not authenticated, the communication data of the device are not transmitted into the first VLAN and as a result, remaining devices of the communication network are protected against the communication data of the device, and
      preventing communication data of the remaining devices from being output to the device via the first VLAN and the first port;
   receiving a diagnostic inquiry for the device from a diagnostic device at a second port of the switch device, the diagnostic inquiry indicating a request for diagnostic data from the device; and
   independently of the test result, forwarding the diagnostic inquiry to the device via the first port in a second VLAN of the communication network, such that a diagnostic capability is retained for the device if the communication data of the device are rejected at the first port because the device has not been successfully authenticated.

2. The method as claimed in claim 1, further comprising transmitting diagnostic data of the device to the diagnostic device in the second VLAN, independently of the test result, the diagnostic data being generated by the device in response to the diagnostic inquiry.

3. The method as claimed in claim 1, wherein the communication data of the device are transmitted in the first VLAN by the switch device to the at least one further device for as long as the authenticity test remains positive.

4. The method as claimed in claim 1, further comprising performing an authenticity test relating to the diagnostic device,
   wherein the forwarding the diagnostic data is performed only if a test result of the authenticity test relating to the diagnostic device is positive.

5. The method as claimed in claim 1, wherein the second VLAN is set up dynamically.

6. The method as claimed in claim 1, wherein the authenticity test of the device is performed during a start of the motor vehicle.

7. The method as claimed in claim 1, further comprising:
   receiving, by the switch device, a blocking command; and
   rejecting the communication data of the device at the first port, based on the blocking command and independently of the test result.

8. A switch device for a motor vehicle having a communication network including a first device, a second device, and a diagnostic device, the switch device comprising:
   a first port configured to be connected to the first device and to receive a device identifier from the first device;
   a second port configured to be connected to the second device;
   a third port configured to be connected to the diagnostic device and to receive a diagnostic inquiry from the diagnostic device, the diagnostic inquiry indicating the diagnostic device would like to request diagnostic data from the first device; and
   a control device configured:
      to perform an authenticity test of the first device based on the device identifier,
      if a test result of the authenticity test is positive, to control the first port to receive communication data of the first device addressed to the second device and to transmit the communication data in a first virtual local area network (VLAN) of the communication network to the second device,
      if the test result is negative:
         to control the first port to reject the communication data, so that in a case of a negative test result, if the first device is not authenticated, the communication data of the first device are not transmitted into the first VLAN and as a result, remaining devices of the communication network are protected against the communication data of the first device, and to prevent communication data of the remaining devices of the communication network from being output to the first device via the first VLAN and the first port, and to forward the diagnostic inquiry, independently of the test result, to the first device, via the first port in a second VLAN of the communication network, such that a diagnostic capability is retained for the first device if the communication data of the first device are rejected at the first port because the first device has not been successfully authenticated.

9. The switch device as claimed in claim 8, wherein if the test result is negative, the switching device is configured to dynamically generate the second VLAN, and the second VLAN is logically isolated from the first VLAN.

10. The switch device as claimed in claim 9, wherein the switching device is configured to deactivate the second VLAN in response to the switching device receiving a diagnosis termination signal.

11. The switch device as claimed in claim 8, wherein if the test result is negative, the switching device is configured to deactivate the first VLAN with respect to the first port.

12. A motor vehicle, comprising:
a chassis;
a first device;
a second device;
a diagnostic device; and
a switch device including:
   a first port connected to the first device in a communication network and to receive a device identifier from the first device;
   a second port connected to the second device;
   a third port connected to the diagnostic device and to receive a diagnostic inquiry from the diagnostic device, the diagnostic inquiry indicating the diagnostic device would like to request diagnostic data from the first device; and
a control device configured:
   to perform an authenticity test of the first device based on the device identifier,
   if a test result of the authenticity test is positive, to control the first port to receive communication data of the first device addressed to the second device and to transmit the communication data in a first virtual local area network (VLAN) of the communication network to the second device,
   if the test result is negative:
      to control the first port to reject the communication data, so that in a case of a negative test result, if the first device is not authenticated, the communication data of the first device are not transmitted into the first VLAN and as a result, remaining devices of the communication network are protected against the communication data of the first device, and
      to prevent communication data of the remaining devices of the communication network from being output to the first device via the first VLAN and the first port, and
   to forward the diagnostic inquiry, independently of the test result, to the first device, via the first port in a second VLAN of the communication network, such that a diagnostic capability is retained for the first device if the communication data of the first device are rejected at the first port because the first device has not been successfully authenticated.

13. The motor vehicle as claimed in claim 12, wherein at least one of the first and second devices is a control device configured to adjust at least one of a driving mode and driving dynamics of the motor vehicle.

* * * * *